United States Patent
Rule et al.

(10) Patent No.: US 9,329,967 B2
(45) Date of Patent: May 3, 2016

(54) METHODS AND SYSTEMS FOR AIDING THE ANALYSIS OF A SIGNAL

(71) Applicant: Tektronix, Inc., Beaverton, OR (US)

(72) Inventors: Keith D. Rule, Beaverton, OR (US); Walter R. Strand, Portland, OR (US); Keith A. Olson, Tigard, OR (US); Michael J. Wadzita, Vancouver, WA (US); Steve M. Mishler, Hillsboro, OR (US)

(73) Assignee: TEKTRONIX, INC., Beaverton, OR (US)

( * ) Notice: Subject to any disclaimer, the term of this patent is extended or adjusted under 35 U.S.C. 154(b) by 170 days.

(21) Appl. No.: 13/675,286

(22) Filed: Nov. 13, 2012

(65) Prior Publication Data

US 2014/0136899 A1    May 15, 2014

(51) Int. Cl.
| | | |
|---|---|---|
| *G06F 11/32* | (2006.01) | |
| *G06F 11/22* | (2006.01) | |
| *G06F 11/26* | (2006.01) | |

(52) U.S. Cl.
CPC ............ *G06F 11/322* (2013.01); *G06F 11/221* (2013.01); *G06F 11/26* (2013.01); *G06F 11/321* (2013.01); *G06F 11/323* (2013.01)

(58) Field of Classification Search
CPC .............................. G06F 11/322; G06F 11/323
USPC ...................................................... 714/43, 57
See application file for complete search history.

(56) References Cited

U.S. PATENT DOCUMENTS

| | | | | |
|---|---|---|---|---|
| 4,639,934 | A * | 1/1987 | Zuranski et al. | 375/226 |
| 5,519,820 | A * | 5/1996 | Kawauchi et al. | 345/440 |
| 5,611,044 | A | 3/1997 | Lundeby | |
| 6,088,029 | A * | 7/2000 | Guiberson | G01R 13/345 345/440.1 |
| 6,229,536 | B1 * | 5/2001 | Alexander | G01R 13/345 345/440 |
| 6,246,408 | B1 * | 6/2001 | Alexander | G01R 13/345 345/440 |
| 6,311,138 | B2 * | 10/2001 | Miller | 702/67 |
| 6,374,388 | B1 * | 4/2002 | Hinch | 714/799 |
| 6,442,730 | B1 * | 8/2002 | Schachner et al. | 714/795 |
| 6,570,592 | B1 * | 5/2003 | Sajdak et al. | 715/769 |
| 6,799,127 | B1 * | 9/2004 | Sontag et al. | 702/68 |
| 6,839,650 | B2 * | 1/2005 | Sutton et al. | 702/123 |
| 7,047,442 | B2 * | 5/2006 | Sutton | 714/25 |

(Continued)

OTHER PUBLICATIONS

Microsoft Corporation, Microsoft Computer Dictionary, 2002, Microsoft Press, Fifth Edition, pp. 77-78 and 480.*

(Continued)

*Primary Examiner* — Albert Decady
*Assistant Examiner* — Paul Contino
(74) *Attorney, Agent, or Firm* — Capitol Patent & Trademark Law Firm, PLLC; Marger Johnson

(57) ABSTRACT

Method and related systems are described for navigating through information related to the status of one or more layers of a signal, such as a serial or parallel bus. Information may be displayed by selecting fields within a visual depicted on an oscilloscope or similar measuring instrument. By selecting particular fields, and indicators, different aspects of a layer may be analyzed without the need to have extensive knowledge of the operation of the measuring instrument.

20 Claims, 7 Drawing Sheets

(56) References Cited

U.S. PATENT DOCUMENTS

| | | | |
|---|---|---|---|
| 7,254,499 B2 * | 8/2007 | Benvenga et al. | 702/68 |
| 7,403,560 B2 * | 7/2008 | Gamper et al. | 375/228 |
| 7,434,113 B2 * | 10/2008 | Miller et al. | 714/700 |
| 7,437,624 B2 * | 10/2008 | Miller et al. | 714/700 |
| 7,483,477 B2 * | 1/2009 | Nygaard, Jr. | 375/224 |
| 7,634,693 B2 * | 12/2009 | Miller et al. | 714/700 |
| 7,756,199 B2 * | 7/2010 | Gamper et al. | 375/228 |
| 7,801,206 B2 * | 9/2010 | Calvin et al. | 375/228 |
| 7,836,352 B2 * | 11/2010 | Sharma et al. | 714/44 |
| 7,965,764 B2 * | 6/2011 | Gamper et al. | 375/228 |
| 8,131,489 B2 * | 3/2012 | Heuser | G01R 13/02 702/189 |
| 9,178,792 B2 * | 11/2015 | Rule | H04L 43/18 |
| 2003/0222873 A1 * | 12/2003 | Ritter | 345/440 |
| 2005/0175079 A1 * | 8/2005 | Gamper | G01R 13/0209 375/228 |
| 2005/0201488 A1 * | 9/2005 | Duff et al. | 375/316 |
| 2006/0245484 A1 * | 11/2006 | Calvin | G01R 13/0254 375/227 |
| 2008/0144618 A1 * | 6/2008 | Frishberg | H04L 43/045 370/389 |
| 2008/0255784 A1 * | 10/2008 | Gamper et al. | 702/67 |
| 2008/0303820 A1 * | 12/2008 | Schachner | 345/440.1 |
| 2010/0131220 A1 * | 5/2010 | Beck | G01R 13/029 702/67 |
| 2011/0261078 A1 * | 10/2011 | Francis | G06F 11/322 345/661 |
| 2011/0286506 A1 * | 11/2011 | Libby et al. | 375/224 |
| 2012/0023429 A1 * | 1/2012 | Medhi | G06F 11/323 715/772 |
| 2013/0332101 A1 * | 12/2013 | Pickerd | G06F 11/30 702/119 |
| 2014/0075380 A1 * | 3/2014 | Milirud | G06F 11/323 715/810 |

OTHER PUBLICATIONS

Agilent InfiniiVision 3000 X-Series Oscilloscopes User's Guide, Feb. 2011, Agilent Technologies, Inc., Second edition, pp. 293-294, 313, and 322.*

Agilent InfiniiVision 5000/6000/7000 Series Oscilloscopes User's Guide, Feb. 2010, Agilent Technologies, Inc., Third edition, pp. 293, 298, 301, 309, and 312-313.*

LeCroy Serial Data Debug Solutions Operator's Manual, Aug. 2011, LeCroy Corporation, Revision A, p. 104.*

Combining Protocol Analysis and Emulation to Identify and Solve SAS-2 Debugging Issues. SCSI Trade Association. Mar. 5, 2008 [Retrieved on Jun. 3, 2014]. Retrieved from the Internet: <URL: http://www.scsita.org/serial-storage-wire/2008/03/combining-protocol-analysis-and-emulation-to-identify-and-solve-sas-2-debugging-issues.html>.*

LeCroy Voyager M3i Protocol Analyzer/Exerciser Quick Start, 2009, LeCroy Corporation, Revision A.*

Agilent Technologies, Training Kit for the Agilent Technologies 16700-Series Logic Analysis System: Making Basic Measurements, Aug. 2001, Agilent Technologies, p. 114.*

Tektronix, Introduction to Mixed Signal Test Solutions, Jan. 2007, Tektronix, pp. 1-11.*

Tektronix, Mixed Signal Oscilloscopes, Oct. 20, 2010, Tektronix, pp. 1-11.*

Strategies for Debugging Serial Bus Systems with Infiniium Oscilloscopes, Application Note 1611, Jun. 1, 2009.

LeCroy WaveRunner 6 Zi Series 400 MHz-4 GHz (8-bit and 12 bit Resolution) The Ultimate Debug Machine, Copyright 2012.

Debugging CAN Buses Using Mixed Signal Oscilloscopes, Andreas Siegert, Agilent Technologies, iCC 2012.

* cited by examiner

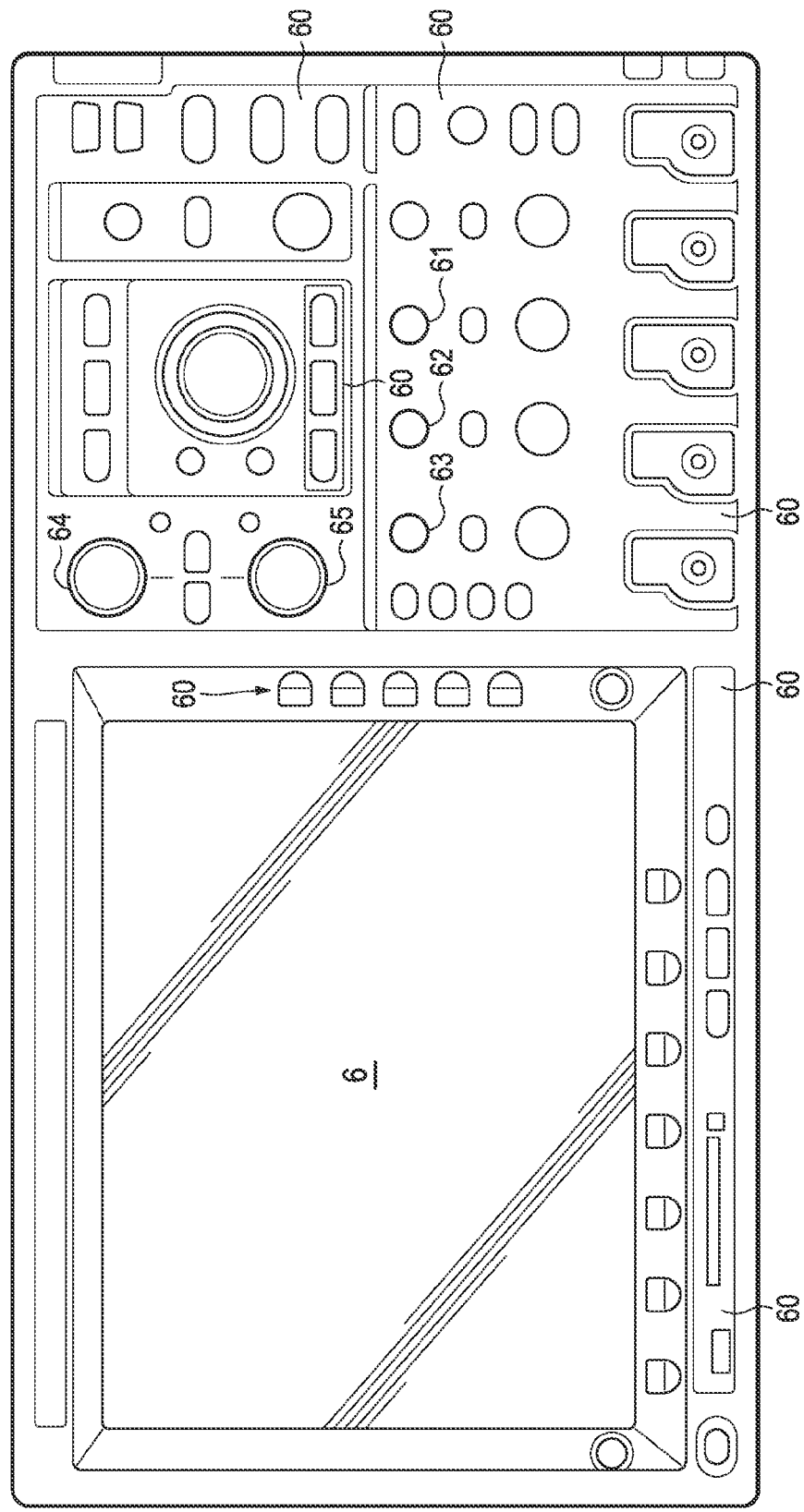

METHODS AND SYSTEMS FOR AIDING THE ANALYSIS OF A SIGNAL

BACKGROUND

The task of completing tests required to assure that an electronic signal, (referred to more commonly as a "bus") complies with recognized standards (so called "compliance testing") and contains no errors (so-called "debugging") is challenging. Often, those responsible for completing compliance testing and debugging do not have a detailed understanding of the measurements that are needed to determine whether a bus is meeting minimum operating conditions set forth in a standard or whether a bus is operating correctly. Further, even when the measurements needed are known and understood, those responsible for completing the measurements do not have a detailed understanding of how to use the instruments necessary to complete the measurements. Recognizing this, manufacturers of test and measurement equipment have provided written material, such as instruction manuals and operating guides, and person-to-person training to assist those responsible for completing the above-referenced measurements. However, such assistance does not appear to have significantly improved the ability of those responsible for completing such measurements.

Accordingly, there is a need for methods and related systems that permit those responsible for completing compliance testing and debugging of a bus, among other types of measurements and signals, to do so without requiring such individuals to have a detailed understanding of a given standard, the measurements required by the standard, troubleshooting procedures, or the operation of a measuring instrument.

SUMMARY

Embodiments of the present invention discussed herein are directed at methods and related systems that permit those responsible for completing compliance testing, debugging and the like (e.g., technicians, engineers, scientists) to do so without requiring such individuals to have a detailed understanding of a given standard, the measurements required by the standard, troubleshooting procedures and/or the operation of a measuring instrument used to complete measurements. The exemplary methods and related systems discussed herein aid in the analysis of a bus or similar signals, particularly, when the analysis involves the use of a measuring instrument (e.g., an oscilloscope with analog and digital input channels).

In accordance with the present invention, exemplary methods and related systems permit individuals to "navigate" through information that may help in identifying phenomena that may be contributing to debugging errors and compliance related problems, for example. In one embodiment of the present invention, navigating through debugging and compliance testing information, in addition to other information, may be done simultaneously through, for example, the presentation (i.e., display) of one or more visuals that contain such information.

In accordance with embodiments of the present invention, there are provided methods and related systems for analyzing the status of a bus, or similar signal. The methods and related systems described herein may be applied and utilized using a bus that includes many layers, where some layers may, commonly, include many sub-layers. As used herein the phrase "layer" refers to either a layer or sub-layer unless otherwise indicated explicitly or by context.

One such method for analyzing the status of a bus may comprise displaying one or more layers of a signal (e.g., a multi-layered, serial or parallel bus), displaying one or more issue indicators, each issue indicator associated with at least one of the displayed layers of the signal, selecting one of the displayed layers having a displayed issue indicator, and displaying one or more issue location indicators in a signal within the selected, displayed layer. The issue indicators may, for example, provide notice to a user viewing the displayed layers of a signal that there is an item of concern with a given layer (or sub-layer). Such displays help simplify the analysis of a bus. Such items of concern may include errors, warnings, advisory information, "help" related information, navigation aids, to name just a few examples. The issue location indicators may, for example, indicate a particular location within a signal, that is within a layer, of such an issue of concern, thus prompting, or otherwise aiding or guiding, a user to investigate the issue further. The method may further comprise selecting one of the displayed issue location indicators, and displaying one or more messages (e.g., analytical information, errors, warnings, advisory information, "help" related information, navigation aids) associated with the selected, displayed issue location indicator. Again, the displays just described help simplify bus analysis.

Additional embodiments provide a user with the ability to analyze different parts of a displayed layer of a signal (i.e., "navigate" through layers of a signal) by selecting, a next one of the displayed issue location indicators within a layer, and then displaying one or more messages associated with the selected, next issue location indicator. It should be noted here, as well as throughout the discussion herein, that the "navigation" features of the present invention are not limited to the use of issue location indicators. That said, multiple embodiments of the invention do include the use of such indicators. In addition to moving within a layer, the method may further provide a user with the ability to move from one layer to another layer of a displayed signal by selecting a next layer from the one or more displayed layers. Thereafter one or more issue location indicators within the selected, next layer may be displayed. In an alternative embodiment of the invention, so-called "NEXT" and "PREVIOUS" control keys, for example, may be used to move from one location within a layer to another location within a layer, and/or to move from one layer to another layer by using such keys to select a next one, or a previously selected one, of the displayed issue location indicators. Thereafter, one or more messages associated with the selected, next or previously selected, issue location indicator may be displayed. Alternatively, a next layer, or previously displayed layer may be selected, from the one or more displayed layers, and, thereafter, one or more issue location indicators within the selected next, or previously selected, layer may be displayed. The embodiments just described may include the use of issue location indicators to navigate using NEXT and PREVIOUS functions. However, this is not required. Yet further, a so-called "ZOOM" control key, for example, may provide a user with the ability to select one of the displayed issue location indicators, and thereafter, visually alter (e.g., expand or contract) an area of a signal associated with the selected, issue location indicator. Similar to the NEXT and PREVIOUS functions, while the ZOOM function is described above as including the use of issue location indicators for navigation this is not required.

In yet additional embodiments of the invention, methods may be provided to display one or more selectable, expandable indicators, each expandable indicator associated with at least one displayed layer, to select one or more of the expandable indicators, and, thereafter, display a visual (e.g., dashboard) associated with the selected, expandable indicator. The visual may comprise, for example, information related to at least debugging and compliance testing information of a displayed layer that is associated with the selected, expandable indicator. In an additional embodiment of the invention the visual may comprise one or more selectable status fields selected from error debugging fields, compliance testing fields or signal operating characteristics fields. Once displayed, an alternative method provides a user with the ability to select one of the selectable status fields in the visual in order to display one or more issue location indicators in a signal within a displayed layer associated with the selected status field. Once the issue location indicators are displayed, a message associated with each of the selected, displayed issue location indicators may also be displayed.

The exemplary methods described above and below may be implemented using an exemplary system, such as an oscilloscope that includes analog and digital input channels. The system my comprise a program memory for storing executable instructions, and a processor operable to access and execute the instructions stored within the memory for completing exemplary features and functions that parallel the exemplary methods described above and herein.

Such an exemplary system may further comprise a display for displaying, for example, one or more: layers of a signal, indicators, and visuals.

Still further, such an exemplary system may further comprise a user interface, comprising a plurality of control keys, for controlling the display of one or more layers of a signal as well as indicators and visuals. In an embodiment of the invention, at least one of the control keys is, for example, a ZOOM key for altering (expanding and/or contracting) an area of a selected layer associated with a position of a selected issue location indicator while another is a NEXT/PREVIOUS control key for moving from location within a layer to another location within a layer, and/or moving from one layer to another layer. These features also help simplify the analysis of a signal (e.g., bus).

Additional aspects of the present invention will become apparent during the course of the following discussion, beginning with reference to the accompanying drawings.

BRIEF DESCRIPTION OF THE DRAWINGS

Referring now to the drawings,

FIG. 6 depicts a user interface that may be part of an exemplary system according to an embodiment of the present invention.

DETAILED DESCRIPTION, WITH EXAMPLES

Prior to describing the details of embodiments (i.e., examples) of the inventive methodologies, embodiments of related systems that may be used to implement such methodologies will be briefly described.

Figure 1:
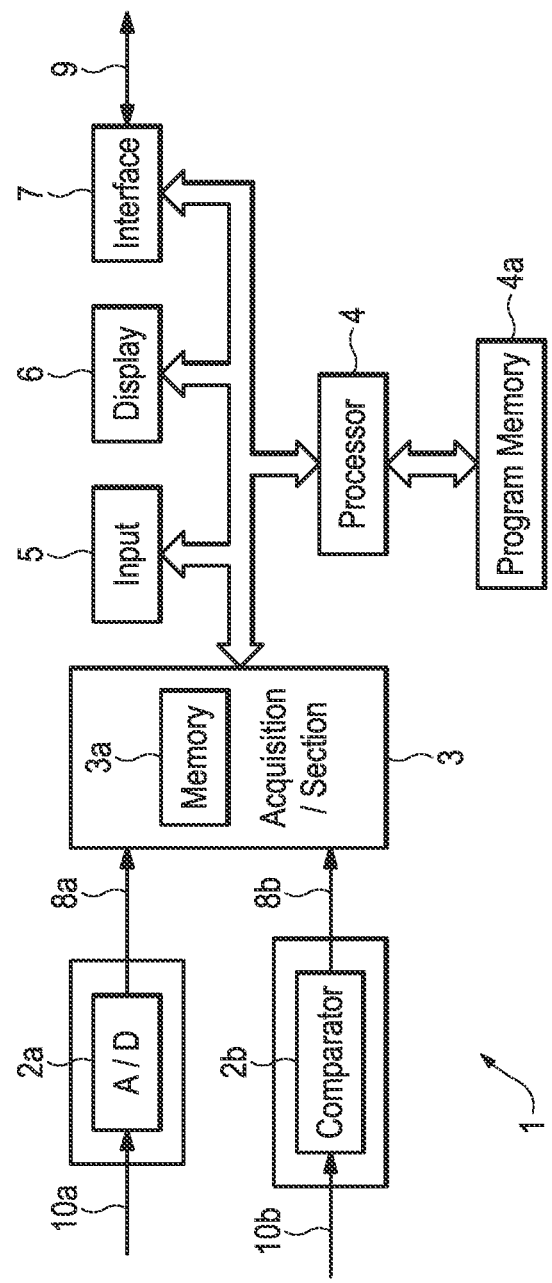
FIG. 1 depicts a block diagram of a system for analyzing the status of a signal (e.g., bus) according to one embodiment of the present invention.

Referring now to FIG. 1, there is shown a block diagram of a system 1 for analyzing the status of a bus, or similar signal according to an embodiment of the present invention. One example of such a system is an oscilloscope having one or more analog and digital input channels. That said, it should be understood that other test and measurement systems/devices may be used as well. The description below will focus on those features of a system that are relevant to the present invention. Accordingly, details concerning the traditional operation of an oscilloscope, such as how an oscilloscope samples a signal and stores it in memory, for example, are not discussed in great detail.

As depicted in FIG. 1, the system 1 may, for example, comprise an analog channel input section 2a, a digital channel input section 2b, acquisition section 3, processor 4, input section 5, display section 6 and interface section 7. In one embodiment of the invention section 2a comprises an analog-to-digital (A/D) converter while section 2b comprises a comparator. Though not shown in FIG. 1, it should be understood that system 1, and in particular input sections 2a, 2b, may be operable to receive one or more analog or digital input signals via one or more channels (e.g., one, two, four or more channels) comprising signals from an electronic or communications device or the like via pathways 10a or 10b, it being understood that analog signals are input via section 2a while digital signals are input via section 2b. The input sections 2a, 2b may be operable to receive and digitize one or more signals, and forward the digitized signals to section 3 via input pathways 8a, 8b in response to a clock signal produced by a known clock source (not shown). A representation of a digitized input signal generated by sections 2a,2b may be stored as digitized, acquired data in acquisition memory 3a of the acquisition section 3. In order to allow for further processing and/or analysis of the data by the processor 4, the acquisition section 3 may be operable to communicate with the processor 4.

The processor 4 may be operable to access executable instructions stored in associated program memory 4a to manage the various operations of the system 1 and to perform various functions, including processing and analyzing the data stored within the acquisition memory 3a. The processor 4 may be implemented as, for example: one or more programmable digital signal processors, programmable microprocessors; or multiple programmable controllers. In yet another embodiment, when the processor 4 is implemented using multiple processors, one processor may be used to control the acquisition, analysis and processing of data and input signals while the second may control the other operations of the system 1. The system 1 may be further controlled using a Windows® Operating System, such as Windows XP®, designed and developed by Microsoft Corporation that is stored, for example, within program memory 4a and accessed, for example, by the processor 4.

The acquisition memory 3a and program memory 4a may comprise any suitable recordable medium or storage medium capable of storing the acquired data, and/or executable instructions and programs (collectively referred to as "instructions" or "executable instructions") that can be accessed and executed by the processor 4. For example, memories 3a, 4a may take the form of RAM, ROM and/or cache memory. RAM memory may be operable to store volatile data, such as acquired data and corresponding data patterns. Though the acquisition memory 3a and program memory 4a are depicted as two separate memories, it should be understood that these memories can be combined into one memory, or further broken down into additional memories. Alternatively, acquired data and/or executable instructions may be stored in a recordable medium separate from memories 3a, 4a that may be accessed by the processor 4 via interface section 7 and interface pathway 9. Such a medium may comprise external or internal mass storage media of a mass storage unit.

The processor 4 may be operable to receive commands via an input section 5, which may comprise a keypad, "mouse" based cursor, pointing device or touch screen, for example. Among its functions, the processor 4 may be operable to control the display, for example, of layers and sub-layers of a signal (e.g., bus), indicators and visuals on display section 6. The display section 6 may comprise a cathode ray tube (CRT), liquid crystal display (LCD) or other display device. The processor 4 may be further operable to communicate with additional devices via interface pathway 9, which may comprise a general purpose interface bus (GPIB), Internet protocol (IP) link, Ethernet link, Universal Serial Bus (USB), next generation USB or faster interfaces, proprietary link or other communications pathway via the interface section 7. In the case where processor 4 communicates with a smart phone or tablet or another device that includes a display, the processor 4 may be further operable to appropriately format and provide data to such a device for display, and, yet further, receive commands and data from such a device to analyze or display, for example, acquired data. While components of system 1 are shown to be directly coupled to each other, it should be understood that system 1 may include a variety of other circuitry or software components which are not necessarily shown, but that are disposed between, or otherwise associated with, the illustrated components of system 1. Such circuitry may include power supplies, clock circuits, cache memory, input/output (I/O) circuitry and the like, as well as specialized circuits that may be used in conjunction with the processor 4 to complete functions in accordance with executable instructions stored in memory 4a. The I/O circuitry may be used to form interfaces between the various elements shown communicating with, or connected to, the processor 4.

In yet another embodiment, rather than make use of processor 4 and memory 4a the system 1 may comprise one or more application specific integrated circuits (ASICs).

Figure 2A:
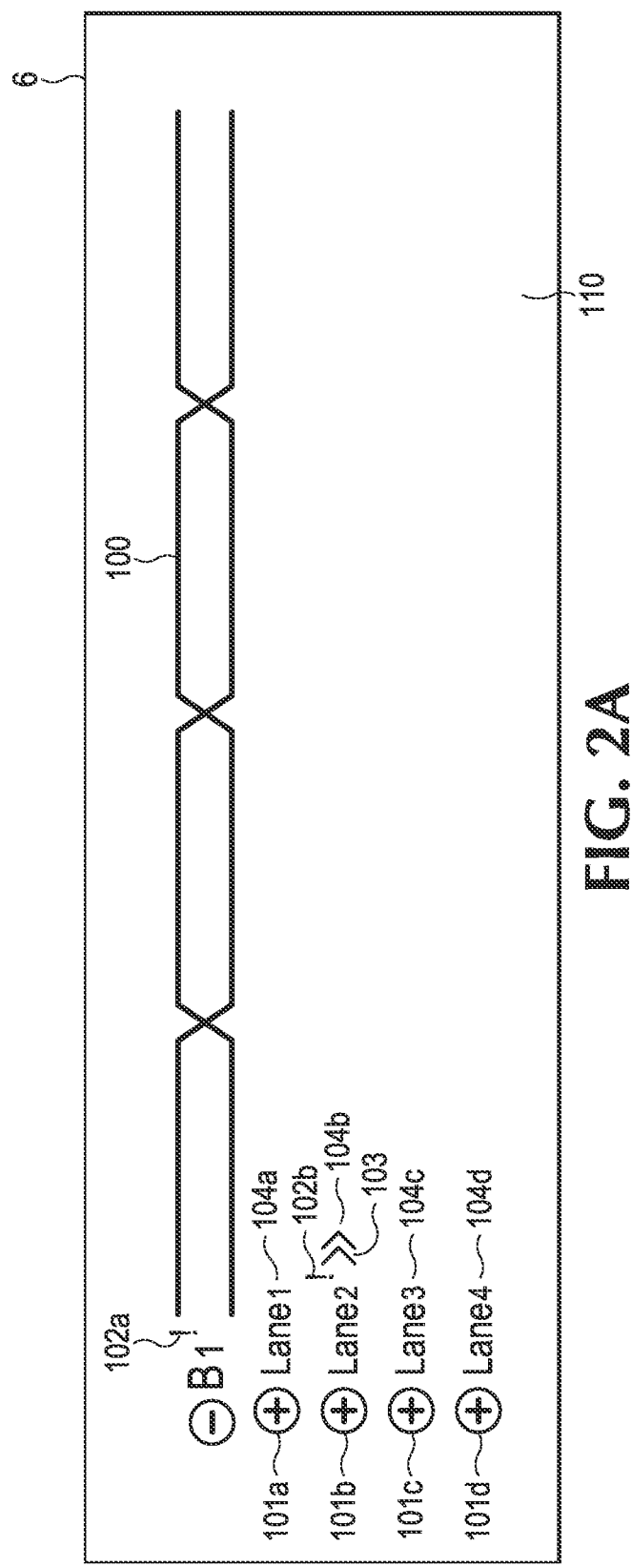
FIG. 2A depicts the display of layers of a bus in accordance with an embodiment of the invention.
Figure 2B:
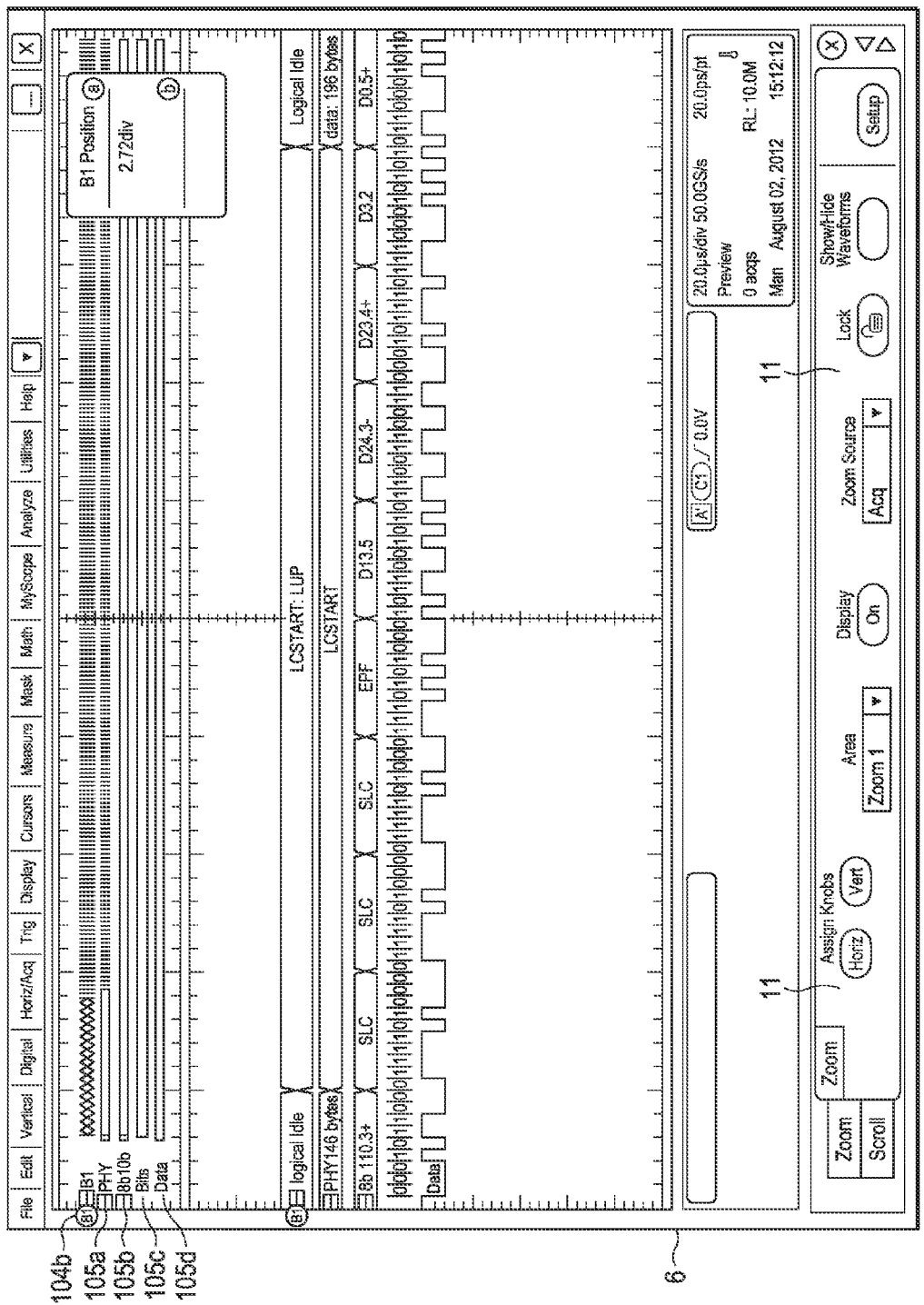
FIG. 2B depicts the display of sub-layers of a layer of a bus in accordance with an embodiment of the invention.
Figure 3:
FIG. 3 depicts the display of layer or sub-layer of a bus that includes indicators used to analyze the status of the bus in accordance with an embodiment of the present invention.

Referring now to FIG. 2A, to aid a user of system 1 in the analysis of a bus, or another type of acquired signal (collectively referred to hereafter as "bus") whose sampled data may be stored in acquisition memory 3a and then displayed on display section 6, the system 1 may be operable to display, on display section 6, a display 110 that includes one or more layers 104a-d of a bus 100. It should be noted that for ease of understanding the signal, pattern or waveform associated with each of the layers 104a-d depicted in FIG. 2A has been omitted. Instead, just the layers themselves are labeled. Some typical signals, patterns or waveforms are shown in FIG. 2B. Though the signals, patterns or waveforms shown in FIG. 2B are within sub-layers 105a-d of layer 104b, they are, nonetheless, representative. Further, a representative signal 301 within layer 104b is depicted in FIG. 3. Continuing, the system 1 may be further operable to display one or more issue indicators 102a,b, where each issue indicator is associated with at least one of the displayed layers 104a,b of the bus 100. In an embodiment of the invention, the issue indicators 102a,b may be used to, for example, provide notice to a user that there is an item of concern with a given layer (or sub-layer), in this case layers 104a,b. Such items of concern may include errors, warnings, advisory information, "help" related information, navigation aids, to name just a few examples. As such, these indicators 102a,b may be used to prompt the user of system 1 to further investigate the indicated issue. In the embodiment depicted in FIG. 2A, the display 110 includes two issue indicators 102a,b. One indicator 102a is associated with the bus 100 and another 102b is associated with the layer 104b. A user of system 1, upon viewing the display 110 and indicators 102a,b, will understand that there is an issue to be addressed concerning bus 100, and in particular, concerning a signal within layer 104b. Accordingly, in an embodiment of the invention, the system 1 may be operable to select one of the displayed layers 104a,b having a displayed issue indicator 102a,b. In response to such a selection, the system 1 may be further operable to display one or more issue location indicators 302a,b (please see FIG. 3) in a signal 301 within the selected, displayed layer, in this case layer 104b (again, please see FIG. 3). Thus, the selection of a layer (e.g., 104b) that has an associated issue indicator (e.g., 102b) results in the display of specific, issue location indicators (e.g., 302a,b) at specific locations within a given signal (e.g., 301) of the selected layer. Also shown in FIG. 2A are one or more layer indicators 101a-d where each layer indicator is associated with at least one layer 104a-d, and one or more selectable, expandable indicators 103, where each indicator 103 may be associated with one layer within bus 100. The layers 104a-d may be referred to as "lanes" when the bus is a serial bus, for example. In accordance with embodiments of the invention, the bus 100 may comprise a serial or parallel bus. The function of the selectable, expandable indicator(s) 103 will be explained later on in this discussion. It should be noted that the phrase "system 1 operable to", or similar phrases, as used herein means, at least the processor 4 operable to access and execute instructions stored in program memory 4a and/or acquired data stored within acquisition memory 3a, for example. Further, it should be understood that when indicators are described herein as being displayed in, or within, a signal, this means that an indicator is shown on a display as being overlaid, for example, on top of, or being otherwise associated with, a portion of a signal. It does not mean that an indicator is actually a part of the original signal, or made a part of the original signal or data. In other words, the indicators are used for display purposes.

Though FIG. 2A depicts four layers 104a-d, four layer indicators 101a-d, two issue indicators 102a,b and one expandable indicator 103 it should be understood that this is for explanatory purposes, and that bus 100 may comprise a fewer or greater number of layers and/or indicators. Further, though the type of indicators shown in FIG. 2A includes exclamation points (for the issue indicators), chevrons (">>", for the selectable, expandable indicators) and plus and minus signs ("+", "−" for the layer indicators) it should also be understood that these indicators are for explanatory purposes—any number of different types of indicators may be used and still be covered by the spirit and scope of the present invention.

As noted earlier, as used herein the phrase "layer" refers to either a layer or sub-layer unless otherwise indicated explicitly or by context. With that in mind, referring now to FIG. 2B, there is depicted a display 111, on display section 6, of exemplary signals within sub-layers 105a-d of a layer 104b of the bus 100 in accordance with an embodiment of the invention. It should be understood that while FIG. 2A depicts layers 104a-d of the bus 100, each of the layers 104a-d may further comprise one or more (i.e., a plurality) sub-layers. In the example depicted in FIG. 2B, layer 104b is depicted as comprising sub-layers 105a-d, for example. The signals within sub-layers 105a-d may comprise, for example, PHY, 8B10b, raw bit, and a digital signal. Accordingly, in an additional embodiment of the invention, the system 1 may be operable to complete the features and functions described above and below for each sub-layer of a layer. For example, the system 1 may be operable to (among other things) display one or more sub-layers of a layer of a signal; display one or more issue indicators, each issue indicator associated with at least one of the displayed sub-layers; select one of the displayed sub-layers having a displayed issue indicator; and display one or more issue location indicators in a signal within the selected, displayed sub-layer.

In accordance with embodiments of the invention, the selection of a layer associated with an issue indicator (or an indicator itself) may be completed in a number of ways. For example, issue indicator 102b may be selected by a user operating a "mouse" controlled cursor, via input section 5, where the cursor is placed on top of the indicator 102b, or any other part of layer 104b, to select the layer 104b. Alternatively, the selection of a layer may be completed by touching the surface of the display section 6 associated with the issue indicator using a touch screen when the display section 6 comprises such a touch screen. Yet further, the selection may be completed by a user interface 60 depicted in FIG. 6. In an embodiment of the invention, one or more of the control keys 61-65 shown in FIG. 6 may function to select the issue indicator 102b and/or layer 104b. Still further, the selection may be made by a pre-determined program or routine stored within program memory 4a in conjunction with processor 4, or stored in a separate controller (not shown) that is operable to control the system 1 via interface section 7 and pathway 9, for example. In either embodiment, once an issue indicator or layer is selected the system 1 may be operable to otherwise indicate that the indicator and/or layer has been selected by highlighting the indicator and/or layer (e.g., changing a color, adding color, or some other type of emphasis), or displaying a message adjacent to the selected indicator or layer, for example.

Referring now to FIG. 3, as noted above, in an embodiment of the invention upon selection of one of the displayed layers 104a,b having a displayed issue indicator 102a,b the system 1 may be further operable to display one or more issue location indicators 302a,b in the signal 301 within the selected, displayed layer, in this case layer 104b. Though only two indicators 302a,b are depicted, it should be understood that this is for illustrative purposes, and that a lesser or greater number of indicators may be displayed. In accordance with additional embodiments of the invention, the ability to analyze the status of a bus, and in particular, a signal within a layer of a bus, may be further aided and enhanced by selecting one of the displayed issue location indicators 302a,b, and displaying one or more messages (not shown) associated with the selected, displayed issue location indicator. The message that is displayed may comprise any number of messages and/or types of messages, including, but not limited to, analytical information (e.g. out of range rise times), errors, warnings, advisory information, "help" related information, and/or navigation aids, to name just a few examples. The format of the message may be a text box or another type of visual indicator that includes information related to a specific issue. In addition to displaying a visual message, audible messages may also be generated or a combination of visual and audible messages may be used. Similar to the selection of an issue indicator and layer described above, the selection of an issue location indicator may be completed by any number of means, examples of which have been described above. For example, to select issue indicator 302a,b shown in FIG. 3, a user may simply touch the surface of the display section 6 associated with the indicator 302a,b, or use a mouse controlled cursor, or input instructions via a keypad. Thereafter, once a particular issue location indicator (e.g., 302a) is selected, the system 1 may be operable to select a next one of the displayed issue location indicators (e.g., 302b), and display one or more messages for the selected, next issue location indicator. The ability to navigate or move from one issue location indicator to another within a layer (or between layers as described below) provides a user with the ability to analyze different parts of a displayed layer of a signal. That said, it should again be noted that the navigation features of the present invention are not limited to the use of issue location indicators. Instead, the system 1 may be operable to move from one portion of a signal within a layer to another portion of the same signal or to a portion of another signal in another layer, for example, without the use of an issue location indicator.

The selection of a next issue location indicator, or any indicator or portion of a display for that matter, may be completed using any number of ways and means described previously above. Yet further, in an additional embodiment of the invention the selection of a next one, or a previously selected one, of a displayed issue location indicator may be completed using a NEXT and/or PREVIOUS control key, such as key 62 depicted in FIG. 6. In an alternative embodiment, the NEXT and PREVIOUS control key(s) may also be used to select any of the layers, indicators, or visuals described above and below with, or without, regards to the use, or position, of an issue location indicator. Continuing, upon depression or otherwise activation of NEXT and/or PREVIOUS keys, the processor 4 may be operable to access instructions within memory 4a to complete any associated functions (e.g., moving to a next or previously displayed indicator). For example, upon selection of a next, or previously selected, issue location indicator the system 1 may be operable to display one or more messages associated with the selected, next or previously selected, issue location indicator. In addition to NEXT or PREVIOUS functions, a further embodiment provides a ZOOM function. In an embodiment of the invention, the system 1 may visually alter (expand or contract) an area of a signal, such as signal 301, associated with a selected issue location indicator, such as indicator 302b. Further, a ZOOM function may be combined with a selection function to simultaneously select and then visually alter the area of a signal. In an embodiment of the invention, the alteration of an area of a signal, such as signal 301, associated with a selected issue location indicator may be completed using a ZOOM control key, such as key 65 depicted in FIG. 6. In another embodiment, a ZOOM function may be combined with a selection function to simultaneously select and then visually alter an area of signal 301 without regard to the position of an issue location indicator (e.g., a user can move to any location within a display).

In addition to moving from one indicator to another within a layer, the present invention provides for embodiments that allow a user to move between layers. For example, moving or navigating from layer 104b to layer 104c in FIG. 2A, or to a sub-layer within another layer. In an embodiment of the invention, the system 1 may be operable to select a next layer from the one or more displayed layers having an associated issue indicator (not shown in FIG. 2A or 2B) and then display one or more issue location indicators in a signal within the selected, next layer using a ZOOM function, for example. Yet, further, the system 1 may be operable to select a next layer, or previously displayed layer, from the one or more displayed layers having an associated issue indicator, and display one or more issue location indicators in a signal within the selected next, or previously selected, layer using a NEXT and/or PREVIOUS function, for example.

In an embodiment of the invention, navigation may involve the sequential selection of one or more indicators (e.g., moving from one indicator to a next or previous indicator) or may be customized. For example, the selection may involving moving (selecting) from one type of indicator to a similar type of indicator (e.g., only those issue indicators that indicate an out of range measurement).

In FIG. 3 the indicators 302a,b are depicted as highlighted indicators located along the waveform or signal 301. It should be understood that this is for illustration purposes, and, in alternative embodiments the indicators 302a,b may comprise one of a number of different types of indicators, such as different, colored highlighted indicators, darker or lighter highlighted indicators, and/or glyph indicators to name just a few examples.

Figure 4:
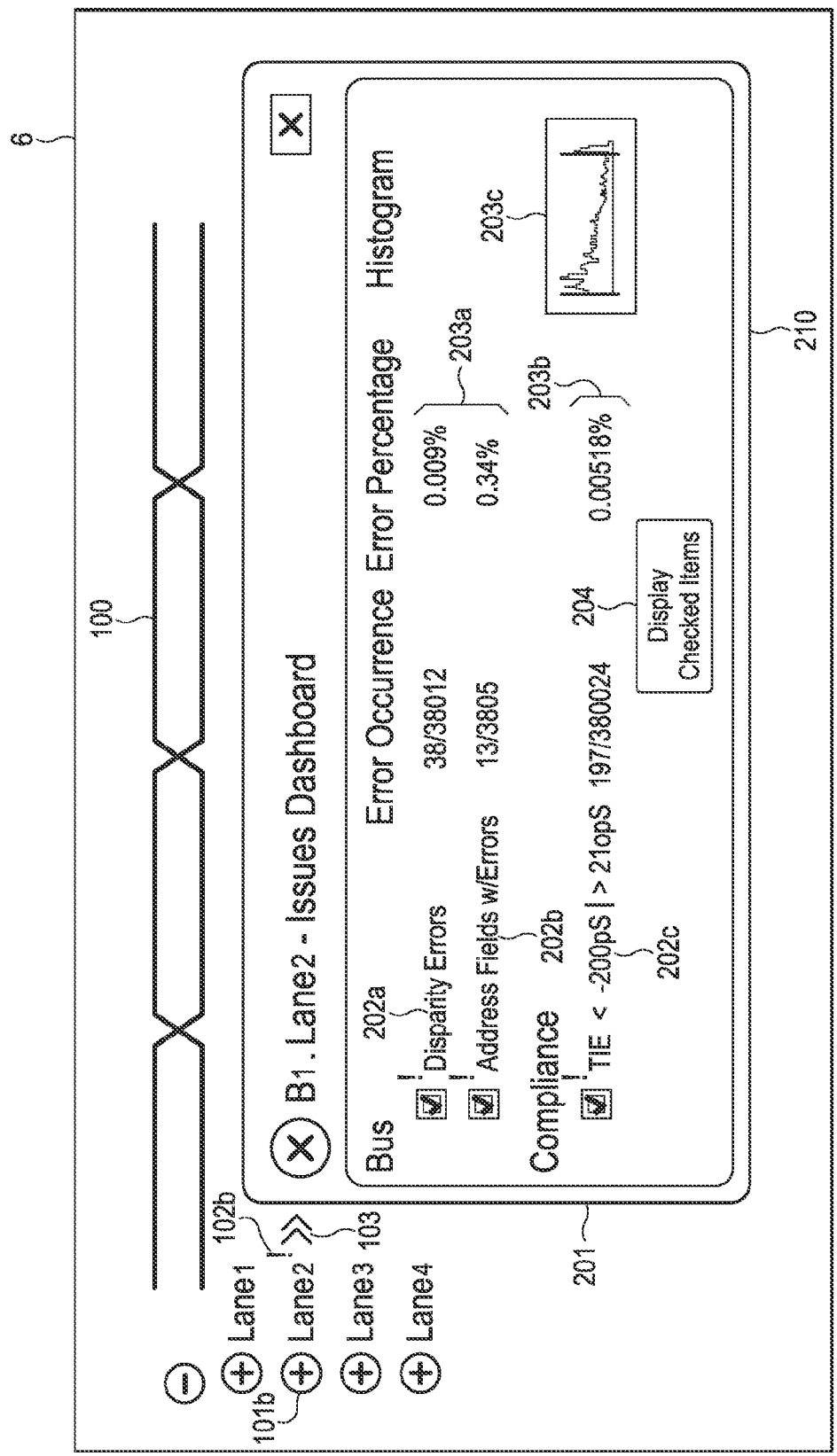
FIG. 4 depicts the display of a visual used to analyze the status of a bus in accordance with an embodiment of the present invention.

Referring now to FIGS. 2A and 4, the present invention provides additional embodiments for aiding in the analysis of a bus. As depicted in FIG. 2A, the system 1 may be operable to display one or more selectable, expandable indicators (e.g., 103), each expandable indicator associated with at least one of the displayed layers (e.g., 104b). Further, upon selection of a selectable, expandable indicator, such as indicator 103, the system 1 may be operable to generate and display a visual associated with the selected, expandable indicator, on display section 6, such as visual 210 shown in FIG. 4. The visual 210 may include various indicators, fields and information related to at least debugging and compliance testing information of a displayed layer 104b associated with a selected, expandable indicator 103. Because the expandable indicator 103 may be associated with a layer 104b, and also with an issue indicator 102b, by selecting the expandable indicator 103 a user may be able to further investigate the issue (or issues) concerning a signal within layer 104b as identified and indicated by indicator 102b by reviewing the content within visual 210.

As depicted in the embodiment shown in FIG. 4, the visual 210 comprises one or more selectable status fields 202a-c (e.g., check boxes). In one embodiment of the invention the visual 210 may comprise a dashboard 201 that comprises the one or more selectable status fields 202 a-c that, when selected, are operable to display information 203a-c related to at least debugging, compliance testing and/or signal operating characteristic information (e.g., analytics) of a signal within at least one layer 104b of the bus 100. Accordingly, in an embodiment of the invention the fields 202a-c may be referred to as debugging, compliance testing and signal operating characteristics fields 202 a-c. Alternatively, the fields 202a-c and/or information 203 a-c may be substantially, simultaneously displayed upon selection of an expandable indicator, such as indicator 103. That is to say, in the latter embodiment the information 203a-c may be displayed without necessarily requiring a user to select a field 202a-c. It should be understood that while the fields 202a-c are depicted as three "check boxes" this is for explanatory purposes—any number of fields, types of fields or input mechanisms may be used to display and/or categorize the information 203a-c and still be covered by the spirit and scope of the present invention.

In addition to displaying information 203a-c within visual 210, upon selection of one of the selectable status fields 202a-c, and then, for example, selection of a display signal indicator 204 (optional), the system 1 may be operable to display one or more issue location indicators, such as indicators 302a,b in a signal (e.g. 301) within a layer (e.g., 104b) associated with the selected status field. In one embodiment, therefore, depending on the status fields 202a-c selected, different issue location indicators 302a,b may be included within the signal 301. As before, each of the issue location indicators 302a,b may indicate the existence of an issue of concern, and are displayed at a specific location or position within the signal 301. In this embodiment, the indicators are associated with the selected status fields 202a-c. Once a bus (e.g. signal 301) and its issue location indicators (302a,b) have been displayed, the system 1 may be additionally operable to display a message, similar to the ones previously discussed, associated with each displayed issue location indicator that is selected. Thus, the present invention provides two methodologies for displaying a signal that includes issue location indicators and messages; either by directly generating such signals and messages or indirectly through the use of a visual, such as visual 210 in FIG. 2A. Regardless of the methodology used, once a signal, and its associated issue location indicators and messages are generated and displayed, a user can navigate from one indicator to another within a layer, or from one layer to another as described previously. In yet another embodiment, once the status fields 202a-c are selected, the system 1 may be operable to display signal 301 without issue location indicators, and thereafter, be further operable to allow a user to navigate from one portion of the signal 301 to another portion within the signal 301, or to another signal or layer, for example.

In addition to displaying the type of visual 210 depicted in FIG. 4, the system 1 may be operable to display different visuals. For example, in an embodiment of the invention, another visual(s) may be displayed that allows a user to interact with layers within a signal. In particular, one type of visual may provide a user with the ability to select an item e.g., (field) from a different layers of a bus hierarchy in order to individually control the test and/or operating parameters (e.g., triggers) to be used in evaluating a signal in a given layer.

Again, to implement the features, functions and processes discussed above (e.g., generation and display of visuals, layers, indicators, messages), the system 1 may comprise a processor 4 operable to access and execute instructions stored in program memory 4a, for example, for completing or implementing the features, functions and processes.

Figure 5:
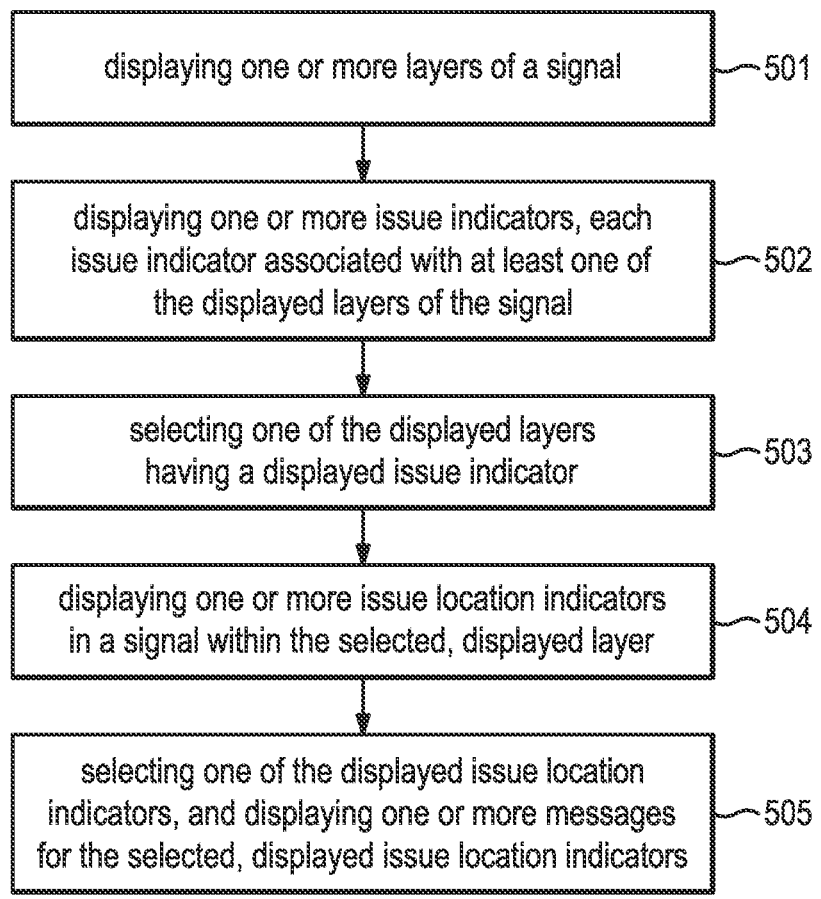
FIG. 5 depicts a flow diagram of an exemplary process that may be completed by an exemplary system in order to analyze the status of a bus according to an embodiment of the present invention.

Referring now to FIG. 5, there is depicted an exemplary, summary flow diagram of one process that may be completed by the system 1 in order to aid in the analysis of a signal (e.g., bus). While the process depicted in FIG. 5 includes the use of indicators, it should be understood that additional embodiments of the invention do not require such indicators. Referring to FIG. 5, such a process may comprise: displaying one or more layers of a signal in step 501; displaying one or more issue indicators, each issue indicator associated with at least one of the displayed layers of the signal, in step 502; selecting one of the displayed layers having a displayed issue indicator, in step 503; and displaying one or more issue location indicators in a signal within the selected, displayed layer, in step 504. The process may further comprise selecting one of the displayed issue location indicators, and displaying one or more messages for the selected, displayed issue location indicators, in step 505.

Referring now to FIG. 6 there is depicted a user interface 60 that may be part of the system 1 for controlling, for example, the generation and display of one or more layers of a bus, selection of visuals, and the content contained within visuals, and navigating between layers and indicators. In accordance with an embodiment of the invention the interface 60 may be used in addition to, or in lieu of, other means of navigating, generating, displaying and selecting layers, visuals, and the content with such visuals, described herein. In one embodiment of the invention the user interface 60 may comprise a plurality of control keys 61-65. In one embodiment, the control keys 61-65 may be a combination of small dials 61-63 and multi-purpose knobs 64, 65 that may be operable to complete the features and functions described herein. For example, in an embodiment of the invention, key 61 may control the selection of a selectable, expandable indicator, key 62 may control the selection of an issue location indicator (e.g., NEXT, PREVIOUS functions), key 63 may control the selection of a selectable status field, while yet another key 64 may control the display of a signal/layer, such as signal 301 in FIG. 4. Additional keys may include at least one key 65 (so-called "ZOOM" key) for more closely, visually examining a displayed signal, for example, by visually altering (expanding and/or contracting) the area that makes up part of a signal that is associated with the position of a selected issue location indicator 302a,b. It should be understood that the positioning of the keys 61-65 is only for illustrative purposes, and that their position may be changed without changing their function or the scope of the invention. Further, though shown as five separate keys, one or more of the keys 61-65 may be combined into fewer keys or may be further separated into additional keys. Alternatively, the control keys may comprise soft keys that are made a part of display section 6. In such a case the generation, display and selection of layers, visuals, and content contained within visuals, may be controlled by touching the screen directly over a soft key. It should be understood that any number of other control keys may be used, such as push keys, control buttons, pull-down menus or the like, or any other suitable means that can be used in conjunction with the embodiments described herein. Yet further, soft keys may be selected using a "mouse-like" device via interface section 7. The interface 60 may be used in conjunction with the embodiments depicted in FIGS. 1-5 described above.

Although particular embodiments of the invention have been described, it will be appreciated that the principles of the present invention are not limited to these embodiments. Other variations and modifications to features and functions of the embodiments discussed herein may be made without departing from the principles, spirit and scope of the invention as set forth in the following claims.

We claim:

1. A method for analyzing the status of a signal comprising:
    displaying a plurality of selectable, expandable layer indicators, each layer indicator associated with one layer of a plurality of layers of the signal;
    displaying one or more issue indicators, each issue indicator associated with at least one of the displayed layer indicators;
    selecting one of the displayed layer indicators having a displayed issue indicator;
    selecting and displaying a layer associated with the selected displayed layer indicator;
    displaying in response to the selection of one of the displayed layer indicators a visual indicator, associated with the selected displayed layer indicator, including one or more selectable status fields related to at least debugging and compliance information of the displayed layer associated with the selected displayed layer indicator;
    selecting at least one of the selectable status fields related to the debugging and compliance information on the visual indicator;
    displaying in response to the selection of the at least one selectable status field the associated layer of the plurality of layers;
    displaying one or more issue location indicators associated with the selected at least one selectable status field in the signal within the selected, displayed layer, wherein each issue location indicator is displayed in the signal at a location of a specific issue;
    selecting one of the displayed issue location indicators; and
    displaying one or more messages for the selected, displayed issue location indicator in response to selecting one of the displayed issue location indicators.

2. The method as in claim 1 wherein the signal is a bus.

3. The method as in claim 1 further comprising:
    selecting a next one of the displayed issue location indicators; and
    displaying one or more messages for the selected, next issue location indicator.

4. The method as in claim 1 further comprising:
    selecting a next layer from the plurality of displayed layers; and
    displaying one or more issue location indicators in the signal within the selected, next layer.

5. The method as in claim 1 further comprising:
    selecting a next one, or a previously selected one, of the displayed issue location indicators; and
    displaying one or more messages associated with the selected, next or previously selected, issue location indicator.

6. The method as in claim 1 further comprising:
    selecting a next layer, or previously displayed layer, from the plurality of displayed layers; and
    displaying one or more issue location indicators in a signal within the selected next, or previously selected, layer.

7. The method as in claim 1 further comprising:
    selecting one of the displayed issue location indicators; and
    visually altering an area of the signal associated with the selected issue location indicator.

8. The method as in claim 1 wherein the one or more selectable status fields comprise error debugging fields, compliance testing fields or signal operating characteristics fields.

9. The method as in claim 1 further comprising displaying a message associated with each of the selected, displayed issue location indicators.

10. A system for analyzing the status of a signal comprising:
    a program memory operable to store executable instructions; and
    a processor operable to execute the instructions stored within the memory to:
    display a plurality of selectable, expandable layer indicators, each layer indicator associated with one layer of a plurality of layers of the signal;
    display one or more issue indicators, each issue indicator associated with at least one of the displayed layer indicators;
    select one of the displayed layer indicators having a displayed issue indicator;
    select and display a layer associated with the selected displayed layer indicator;
    display in response to the selection of one of the displayed layer indicators a visual indicator, associated with the selected issue indicator, including one or more selectable status fields related to at least debugging and compliance information of the displayed layer associated with the selected issue indicator;
    select at least one of the selectable status fields related to the debugging and compliance information on the visual indicator;
    display in response to the selection of one of the at least one selectable status field the associated layer of the plurality of layers;
    display one or more issue location indicators associated with the selected at least one selectable status field in the signal within the selected, displayed layer, wherein each issue location indicator is displayed in the signal at a location of a specific issue;
    select one of the displayed issue location indicators; and
    display one or more messages associated with the selected, displayed issue location indicator in response to selecting one of the displayed issue location indicators.

11. The system as in claim 10, wherein the processor is further operable to execute the instructions stored within the memory to:
   select a next one of the displayed issue location indicators; and
   display one or more messages associated with the selected, next issue location indicator.

12. The system as in claim 10, wherein the processor is further operable to execute the instructions stored within the memory to:
   select a next layer from the plurality of displayed layers; and
   display one or more issue location indicators in a signal within the selected, next layer.

13. The system as in claim 10, wherein the processor is further operable to execute the instructions stored within the memory to:
   select a next one, or a previously selected one, of the displayed issue location indicators; and
   display one or more messages associated with the selected, next or previously selected, issue location indicator.

14. The system as in claim 10, wherein the processor is further operable to execute the instructions stored within the memory to:
   select a next layer, or previously displayed layer, from the plurality of displayed layers; and
   display one or more issue location indicators in a signal within the selected next, or previously selected, layer.

15. The system as in claim 10, wherein the processor is further operable to execute the instructions stored within the memory to:
   select one of the displayed issue location indicators; and
   visually alter an area of the signal associated with the selected issue location indicator.

16. The system as in claim 10, wherein the processor is further operable to execute the instructions stored within the memory to:
   display a visual indicator, associated with the selected, expandable indicator, comprising information related to at least debugging and compliance information of the displayed layer associated with the selected, expandable indicator.

17. The system as in claim 10, wherein the processor is further operable to execute the instructions stored within the memory to display a message associated with each of the selected, displayed issue location indicators.

18. The system as in claim 10 further comprising a display for displaying at least the plurality of layers, one or more issue indicators, and one or more issue location indicators.

19. The system as in claim 10 wherein the system comprises an oscilloscope.

20. The system as in claim 10, wherein the system further comprises an interface for controlling display of at least the plurality of layers, the interface comprising a plurality of control keys.

* * * * *

UNITED STATES PATENT AND TRADEMARK OFFICE
CERTIFICATE OF CORRECTION

| | | |
|---|---|---|
| PATENT NO. | : 9,329,967 B2 | Page 1 of 1 |
| APPLICATION NO. | : 13/675286 | |
| DATED | : May 3, 2016 | |
| INVENTOR(S) | : Keith D. Rule et al. | |

It is certified that error appears in the above-identified patent and that said Letters Patent is hereby corrected as shown below:

In the claims
In column 13, line 13, replace "a signal" with -- the signal --;
In column 13, line 26, replace "a signal" with -- the signal --.

Signed and Sealed this
Twenty-first Day of June, 2016

Michelle K. Lee
*Director of the United States Patent and Trademark Office*